United States Patent Office 2,811,720
Patented Oct. 29, 1957

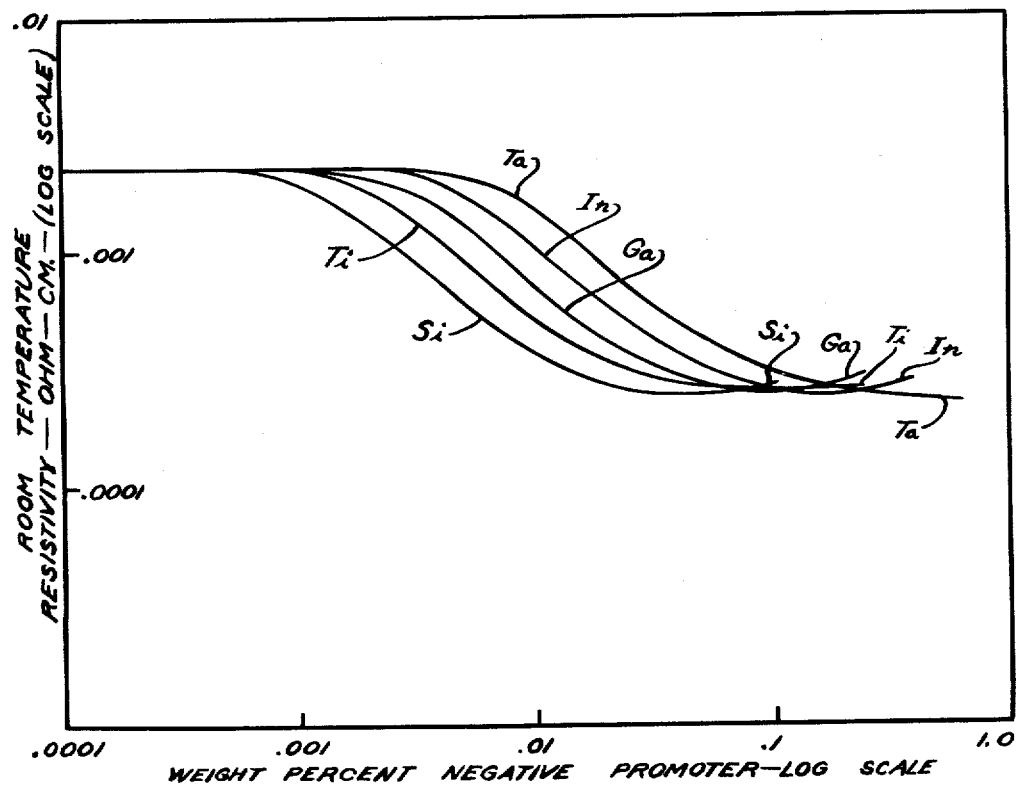

2,811,720

ELECTRICALLY CONDUCTIVE COMPOSITIONS AND METHOD OF MANUFACTURE THEREOF

Robert W. Fritts, Elm Grove, Wis., and Sebastian Karrer, Port Republic, Md., assignors to Baso Inc., a corporation of Wisconsin Application December 15, 1954, Serial No. 475,542

26 Claims. (Cl. 75—166)

This invention relates to semi-metallic alloys or compositions, composed in the main of lead and selenium, and more particularly to electrical conductors comprising such alloys or compositions.

It is an object of the invention to provide electrically conductvie alloys or compositions as aforesaid having new relationships of certain electrical characteristics.

A further object is to provide electrically conductive alloys or compositions of the character indicated, in which the magnitudes of certain of the electrical charcteristics thereof are reproducible within desired ranges therefor.

A further object is to provide electrically conductive alloys or compositions of the character indicated, the electrical conductivity of which may be either positive or negative, as desired.

Another object is to provide electrically conductive alloys or compositions of the character indicated, the resistivity of which may be controlled in magnitude as desired.

A further object is to provide electrically conductive alloys or compositions as aforementioned, the electrical characteristics, particularly with respect to polarity, of which are controllable and reproducible.

A further object of the invention is to provide electrically conductive alloys or compositions as aforementioned, in which desired resistivities therefor are reproducible.

Another object is to provide electrically conductive alloys or compositions of the character indicated, the thermoelectric power of which may be controlled in magnitude as desired.

A further object is to provide electrically conductive alloys or compositions as aforementioned in which the polarity of thermoelectric power may be either positive or negative as desired.

A further object is to provide electrically conductive alloys or compositions as aforementioned, having new relationships of thermoelectric power and resistivity, and which are readily reproducible within desired ranges of such relationships.

A further object is to provide electrically conductive alloys or compositions, the electrical characteristics of which are substantially independent of prior heat treatment.

A further object of the invention concerns a method of fabrication of the aforementioned alloys or compositions to provide for the reproducible production thereof within desired ranges of thermoelectric power and resistivity.

A further object is to provide a method as last mentioned for arbitrarily rendering such alloys or compositions either of positive or negative polarity.

A further object is to provide alloys or compositions as aforementioned having adequate mechanical strength for practical applications over a wide temperature range.

A further object is to provide electrically conductive alloys or compositions of the character above-mentioned which are chemically stable over a wide temperature range when shielded from oxidizing atmospheres.

A further object is to provide electrical conductors composed of the alloys or compositions of the present invention.

Now, in order to acquaint those skilled in the art with the manner of practicing and utilizing the present invention, there is hereinafter disclosed certain preferred embodiments of the invention.

In the drawings:

Figures 3, 3A and 3B are graphic illustrations of the resistivity characteristics of certain of the electrically conductive semi-metallic alloys or compositions of the invention, within certain ranges of additions of negative promoters therein;

Figure 5:
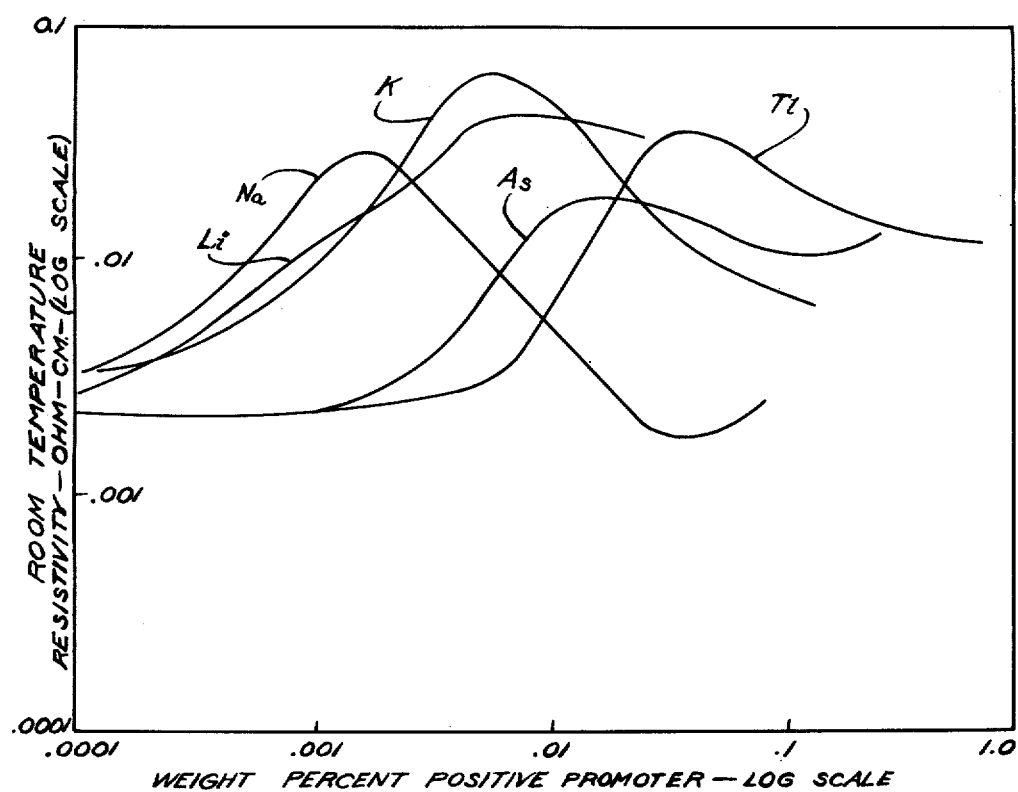
Figure 6:
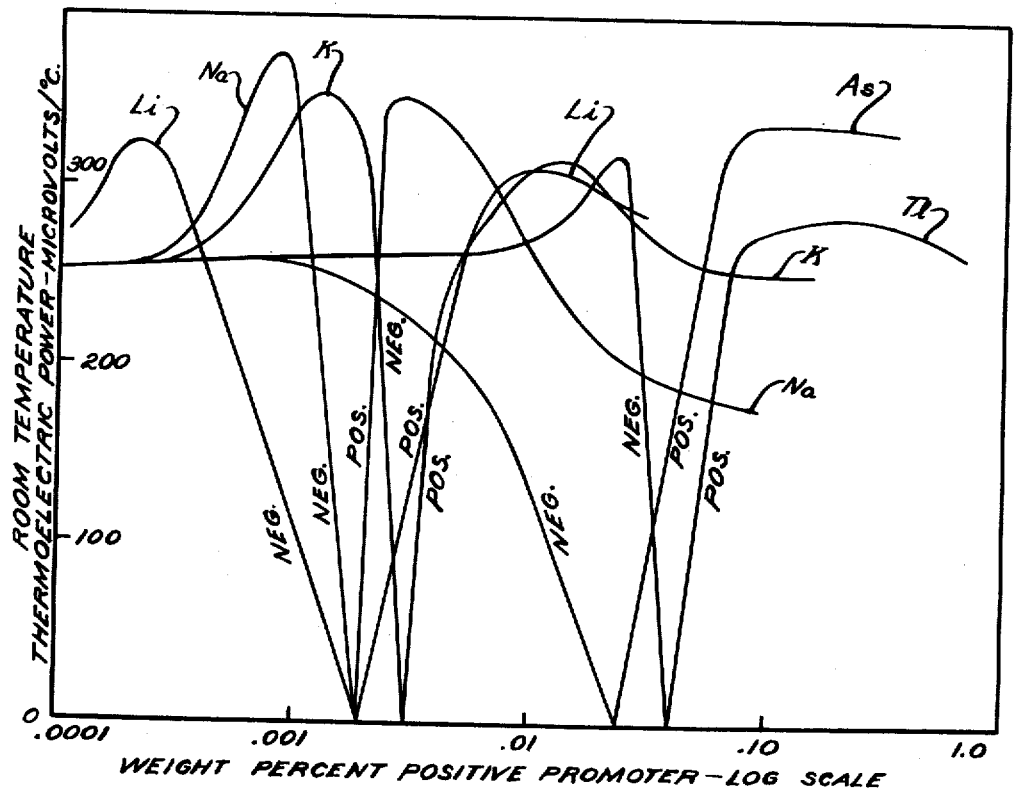

Figure 5 is a graphic illustration of the resistivity characteristics of certain of the electrically conductive semi-metallic alloys or compositions of the invention, within certain ranges of additions of positive promoters therein; and Figure 6 is a graphic illustration of the thermoelectric power characteristics of the electrically conductive semi-metallic alloys or compositions depicted in Figure 5.

The invention described and claimed herein utilizes a lead-selenium base composition or alloy consisting essentially of lead in the range of 72.45% to 73.50% by weight, balance substantially all selenium, and which base composition contains not more than 0.001% by weight of other matter.

Lead-selenium base alloys within the aforementioned range and of the aforementioned purity are negative electrical conductors and exhibit high negative thermoelectric power, nominally higher electrical resistivity, and low thermal conductivity with respect to a metal. Such compositions or alloys have utility as electrical conductors.

In lead-selenium base alloys of the aforementioned range and purity the magnitudes of the thermoelectric power and electrical resistivity are strongly dependent upon the heat treatment afforded the alloy during fabrication, thereby affording control of such properties by the heat treatment.

The aforementioned lead-selenium alloys may be best described metallographically as two-phase alloys. It has been observed that these alloys, when sectioned and examined microscopically, comprise a major phase comprising crystal grains varying usually from 1 to 10 millimeters in size and between such grains there exist thin relatively darker regions of a second phase. The grains of the primary phase are crystals of the intermetallic compound lead-selenide which contain approximately 72.41% lead by weight. The darker second phase, clearly discernible at the grain boundaries, is lead containing a minor concentration of selenium.

The function of the second phase in such alloys is thought to be threefold. First, the thermal equilibrium between the two phases, which is established by the heat treatment aforementioned, induces negative thermoelectric power and conductivity in the primary lead-selenide phase which, because of its high concentration in the alloy, controls the electrical properties of the two-phase alloy. Secondly, the thin layers act as a cementing agent for the grains of the primary phase, thereby improving the mechanical strength of the alloy when compared to that of the pure intermetallic compound. This cementing action of the second phase improves the strength of an alloy in tension and compression at all temperatures up to 815° C. Thirdly, the second phase affords good electrical continuity in the polycrystalline alloy by rendering the intergranular component of electrical resistivity negligible. We have found that the actual concentration of second phase is not critical so long as the composition is maintained within the aforementioned specified ranges.

Lead-selenium alloys containing less than 72.45% lead by weight do not usually exhibit reproducible physical and electrical properties when in a polycrystalline state, and in alloys containing more than 73.50% lead by weight the second phase regions are of such dimension that the electrical conductivity along the grain boundaries of the alloy cannot be neglected when compared with the conductivity through the primary phase. Moreover, unless the specified ranges of compositions and purity are adhered to, third element "promoters" hereinafter described will be rendered ineffective. Additionally, alloys having large concentrations of the aforementioned second phase are subject to plastic flow at high temperatures and for this further reason are not desirable for high temperature applications. Accordingly, the specified composition ranges and purity are to be considered critical.

It will be observed that since the electrical properties of the aforementioned alloys or compositions are dependent upon the equilibrium temperature from which they have been quenched, use of such alloys or compositions is limited to such temperatures as will not affect the electrical characteristics established by the quenching treatment. Accordingly, for high temperature applications requiring fixed values of electrical characteristics arbitrary changes in these characteristics must be derived from the adjustment of factors other than temperature and annealing history.

We have further discovered that the electrical characteristics of lead-selenium base alloys or compositions of the aforementioned range and purity can be markedly and advantageously altered in a reproducible manner by the addition thereto of controlled amounts of matter other than lead or selenium. For convenience, these additions are herein designated "third element additions" to distinguish them from the lead and selenium constituents of the alloys of the invention.

The "third element additions" which we have found effective for the purposes of the present invention when added in minor amounts to the lead-selenium base alloy aforementioned are: Iodine, chlorine, bromine, zirconium, silicon, titanium, indium, tantalum, gallium, aluminum, copper, gold, bismuth, antimony, fluorine, columbium, sodium, thallium, potassium, lithium and arsenic.

The third element additions aforementioned may be either "positive promoters" or "negative promoters" as hereinafter defined, and the resultant alloy or composition may be a "positive" or "negative" alloy or composition or conductor, as also hereinafter defined.

A "negative" composition or alloy and a "negative" conductor is to be understood through this specification and appended claims as meaning an alloy, composition or conductor which exhibits negative conductivity as evidenced by Hall effect measurements or thermoelectric effect measurements, both taken at room temperature. Similarly, a "positive" composition or alloy and a "positive" conductor is to be understood as meaning an alloy, composition or conductor which exhibits positive conductivity as evidenced by Hall effect measurements or thermoelectric effect measurements, both taken at room temperature.

"Negative Promoters" are those which, when added to the lead-selenium base alloy previously defined, alter the electrical conductivity without changing the polarity of the conductivity or thermoelectric power of the base alloy (it being negative according to the preceding definition). "Positive Promoters" are those which, when added to the lead-selenium base alloy, cause at first, with very small additions, reduction in the conductivity of the alloy to a minimum value beyond which further increase in the concentration of the positive promoter causes an increase in the conductivity of the alloy accompanied by a reversal in the polarity of the conductivity and thermoelectric power, i. e., from negative to positive.

The functions of such negative and positive promoters should be contrasted for sake of clarity as follows:

(1) Increasing concentrations of the negative promoter elements cause increases in the conductivity and decrease of the thermoelectric power of the resulting alloy, as compared to that of the lead-selenium base alloy, while preserving the negative polarity of the conductivity and thermoelectric power thereof.

(2) Increasing concentrations of positive promoter elements cause initially reductions in the conductivity and increase in the thermoelectric power of the lead-selenium base alloy, until a minimum conductivity is reached whereupon the thermoelectric power and conductivity reverse polarity to the positive sense, and further increase in the concentrations of the positive promoter causes increase in the conductivity and decrease of the thermoelectric power in the resulting alloy.

Figure 1:
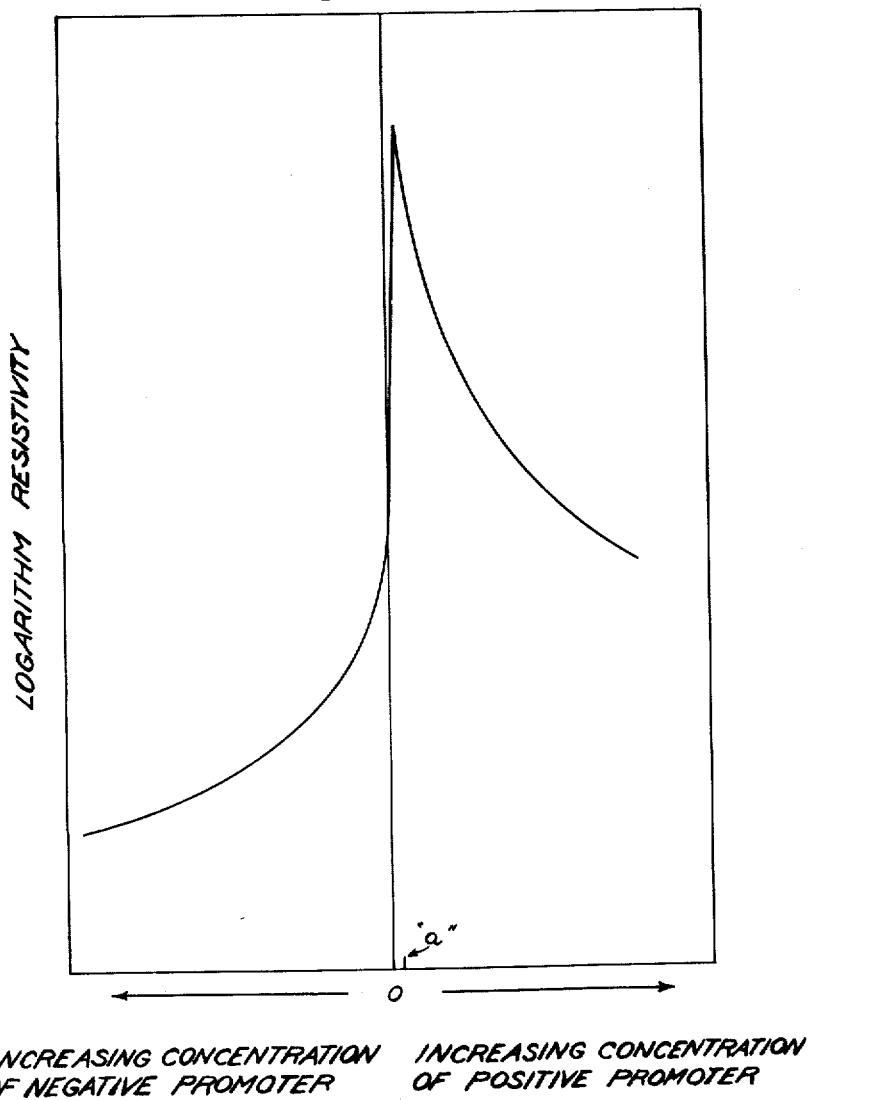
Figure 1 is a graphic illustration generally indicating the effect of various concentrations of negative and positive promoters with respect to the resistivity characteristics of the electrically conductive semi-metallic alloys or compositions of the invention.
Figure 2:
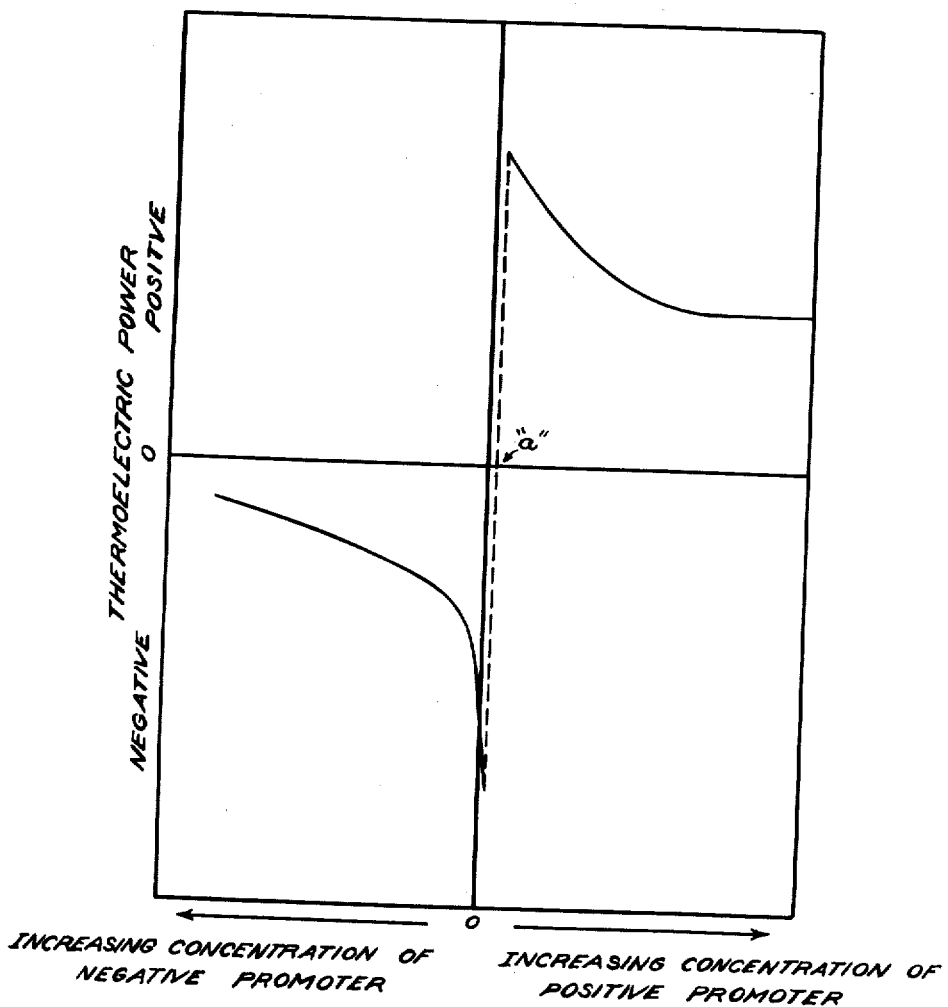
Figure 2 is a graphic illustration generally indicating the effect of various concentrations of negative and positive promoters with respect to the thermoelectric power characteristics of the electrically conductive semi-metallic alloys or compositions of the invention.
Figure 3:
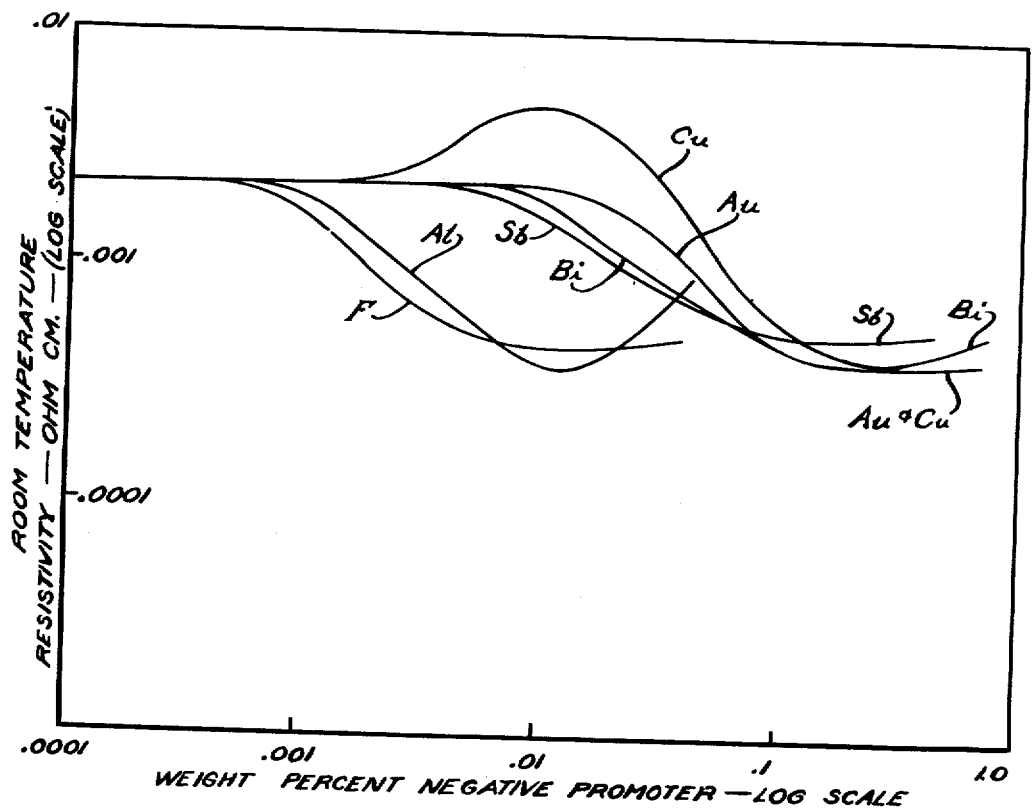
Figure 3B:
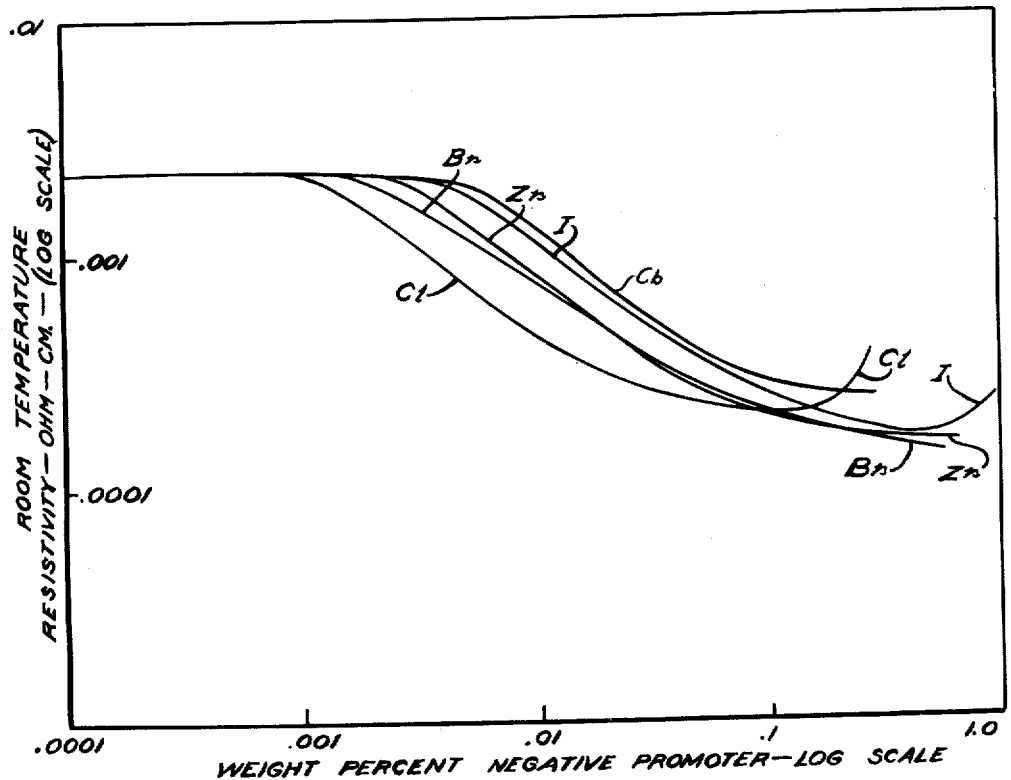
Figure 4:
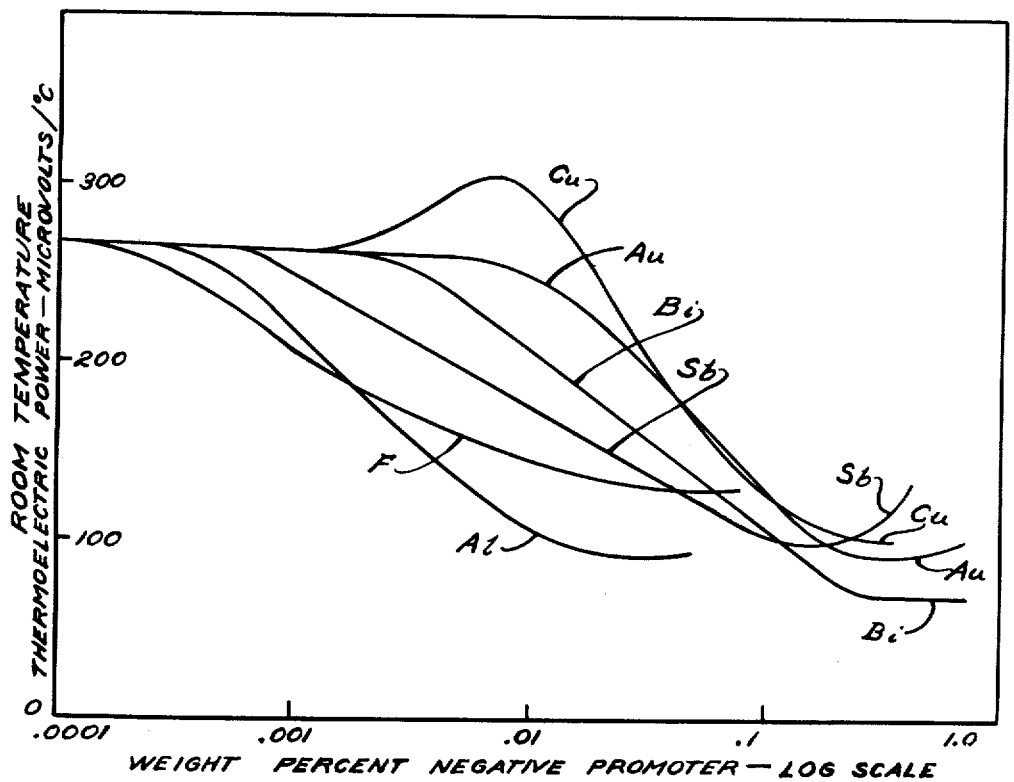
Figures 4, 4A and 4B are graphic illustrations of the thermoelectric power characteristics of the electrically conductive semi-metallic alloys or compositions depicted in Figures 3, 3A and 3B, respectively.
Figure 4A:
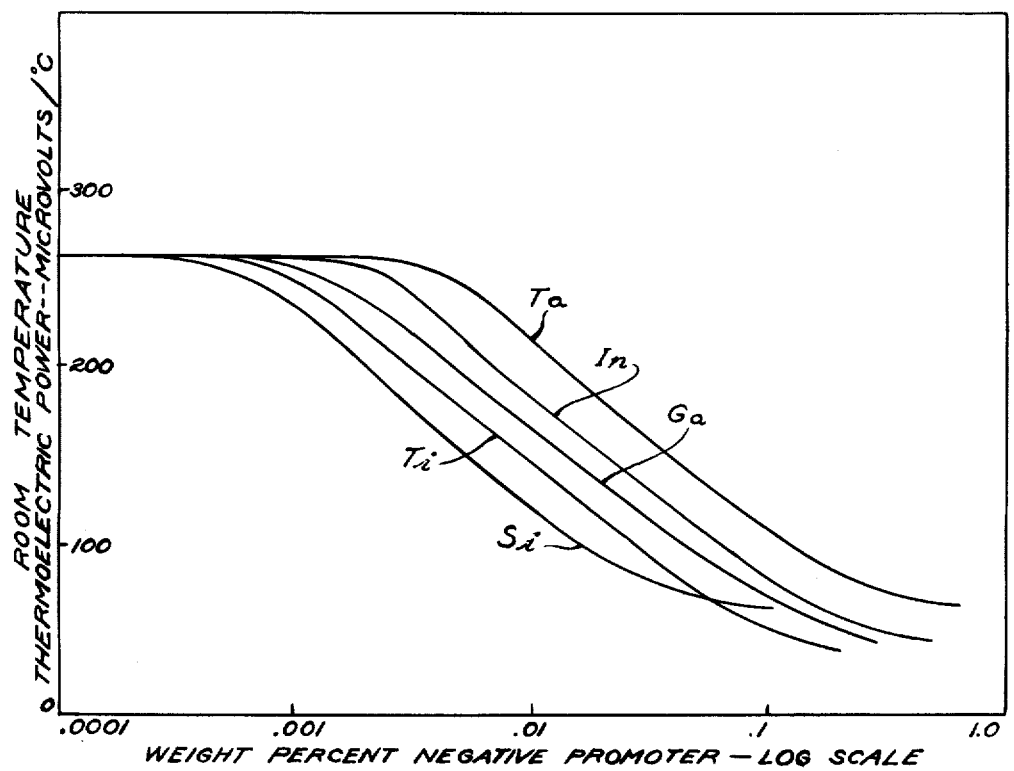
Figure 4B:
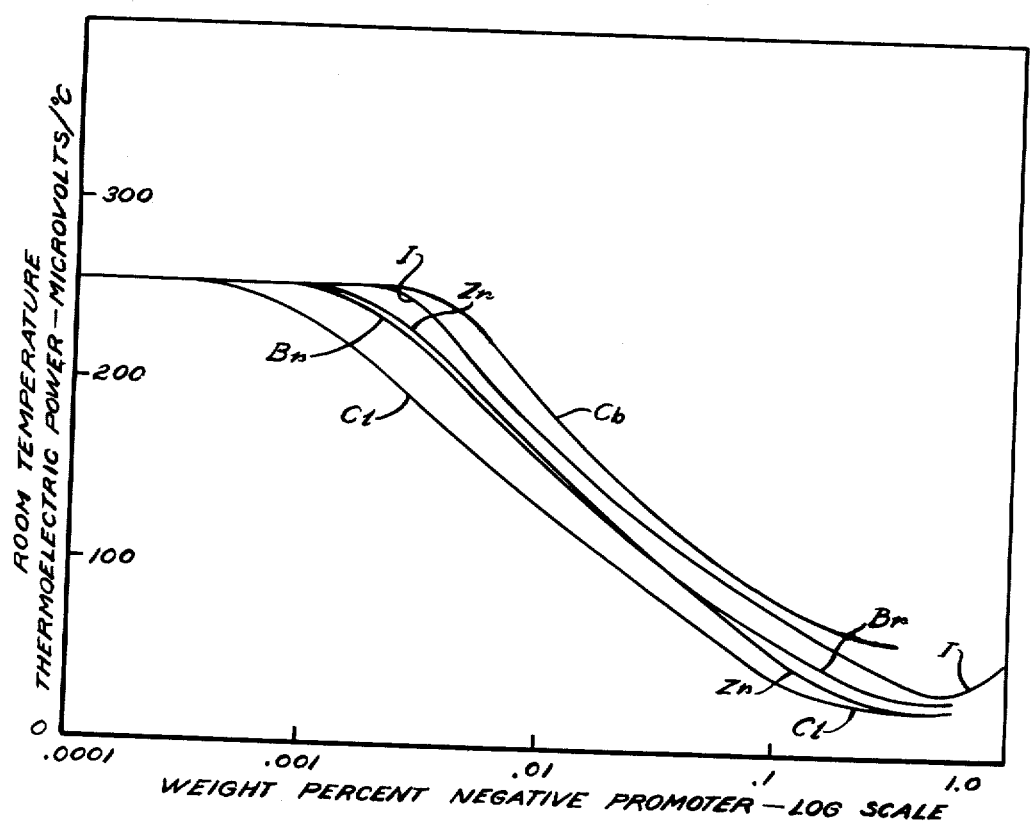

The aforeindicated effects are graphically illustrated in Figures 1 and 2, wherein the effect of varying the concentrations of the aforementioned negative and positive promoters are plotted. In both Figures 1 and 2, the central vertical axes give the properties of the aforedescribed base lead-selenium alloy or composition. The left halves of each of the figures characterize the change, at room temperature, of the electrical properties of the lead-selenium base alloys or compositions with the addition of the aforementioned negative promoters. It will be observed that the two drawings, Figures 1 and 2, have no scales applied thereto since the concentration ranges differ for each of the third element additions to be hereinafter described due to variations in atomic weights and concentration limits. The right halves of each of Figures 1 and 2 show the changes in the electrical properties as positive promoters are added to the base alloy or composition. It should be noted that for a given promoter element the maximum resistivity and the polarity reversal of the thermoelectric power occur at the same concentration. This concentration in indicated by "a" in Figures 1 and 2.

Table I below, first column thereof, lists certain elements which we have found effective as negative promoters when added to the aforementioned lead-selenium base alloys or compositions. Second column of Table I lists the order of the maximum concentration limits by weight per cent of such promoters to the base alloy effective for achieving the objects of the invention. It is to be understood that these concentration limits are the maximum which effectively alter the electrical properties of the base alloy. Concentrations in excess of the stated amounts of such additives have no appreciable effect in beneficially altering the electrical properties with which this invention is concerned, and in this sense the limits indicated are to be considered critical. The third and fourth columns of Table I set forth the electrical properties at room temperature of lead-selenium alloys promoted with the maximum useful concentrations of the negative promoters, after high temperature annealing as hereinafter disclosed.

Table I

| Negative Promoters | Order of Maximum Effective Concentration Limits By Weight Percent | Thermoelectric Power, Microvolts/° C. | Resistivity, Ohm-Cm. |
|---|---|---|---|
| Iodine | 0.50 | −40 | 0.00016 |
| Chlorine | 0.20 | −38 | 0.00018 |
| Bromine | 0.60 | −34 | 0.00014 |
| Zirconium | 0.60 | −27 | 0.00016 |
| Silicon | 0.10 | −54 | 0.00024 |
| Titanium | 0.10 | −40 | 0.00026 |
| Indium | 0.20 | −54 | 0.00024 |
| Tantalum | 0.60 | −45 | 0.00022 |
| Gallium | 0.15 | −58 | 0.00027 |
| Aluminum | 0.03 | −101 | 0.00037 |
| Copper | 0.30 | −104 | 0.00038 |
| Gold | 0.35 | −104 | 0.00039 |
| Bismuth | [1] 0.40–2.5 | −75 | 0.00040 |
| Antimony | [1] 0.20–1.5 | −103 | 0.00050 |
| Fluorine | 0.02 | −133 | 0.00047 |
| Columbium | 0.35 | −65 | 0.00023 |

[1] The range set forth is discussed below.

Figures 3, 3A, 3B, 4, 4A and 4B of the drawings may be here referred to for a graphic illustration of the effect of the additions of the negative promoters of Table I with respect to the resistivity and thermoelectric power characteristics (measured at room temperature) afforded by addition to the lead-selenium base alloys or compositions of each of the negative promoters set forth in Table I, and with the variations indicated in the amount thereof added in each case.

As previously mentioned, certain positive promoters may also be alloyed with the aforementioned lead-selenium alloys, and such promoters are listed in column 1 of Table II below. The second column of Table II, like the corresponding column of Table I, sets forth the order of the maximum concentration limits by weight percent of such promoters to the base alloy effective for achieving the objects of the invention. Again, it will be observed that concentrations of the positive promoters to the lead-selenium base alloy in amounts in excess of that contained in column 2 of Table II have no appreciable effect in beneficially altering the electrical properties with which this invetnion is concerned and in this sense the limits indicated are to be considered critical.

Column 3 of Table II sets forth the concentration by weight percent of the positive promoters listed at which the polarity of conductivity and thermoelectric power of the promoted alloy reverses. These are the concentration values for the promoters respectively, indicated generally by point "a" in Figures 1 and 2.

Columns 4 and 5 set forth the thermoelectric power and resistivity characteristics at room temperature of the alloy or composition resulting from the addition of the aforedescribed positive promoters in the amount shown in column 2 after high temperature annealing and subsequent slow cooling as hereinafter disclosed.

Table II

| Positive Promoters | Order of Maximum Effective Concentration Limit By Weight Percent | Concentration, Weight Percent at Which Polarity Reverses (Point "a" Figures 1 and 2) | Thermo-Electric Power, Microvolts/°C. | Resistivity Ohm-Cm. |
|---|---|---|---|---|
| Sodium | 0.08 | .002 | +180 | 0.0019 |
| Thallium | [1] 0.72–1.5 | [1] .04–.08 | +263 | 0.0108 |
| Potassium | 0.15 | .003 | +250 | 0.0076 |
| Lithium | 0.03 | .002 | +288 | 0.0108 |
| Arsenic | [1] 0.10–0.30 | [1] .02–.06 | +331 | 0.0110 |

[1] The range set forth is discussed below.

As aforementioned, the lead-selenium base alloy previously described is a two-phase alloy. When the aforedescribed third element additions are incorporated in the base alloy, such third element additions become distributed between the two phases. We have discovered that the nature of such distribution has negligible effect upon the electrical properties of the composition in all cases except that of bismuth, antimony, thallium and arsenic. Accordingly, in the case of bismuth, antimony, thallium and arsenic, the maximum effective concentration is dependent upon the lead content of the lead-selenium base alloy within the ranges stated therefor in Tables I and II. We have found 2.50% by weight bismuth to be the maximum effective concentration for lead-selenium base alloys containing 73.50% lead; for base alloys containing less lead the maximum effective bismuth concentration is somewhat less, that is ranges down to 0.40% by weight when the lead content ranges down to 72.45%. Similarly, in the case of antimony, the maximum effective concentration is dependent upon the lead content of the lead-selenium base alloy within the range stated therefor. We have found 1.5% by weight antimony to be the maximum effective concentration for lead-selenium base alloys containing 73.50% lead; for base alloys containing less lead the maximum effective antimony concentration is somewhat less, that is ranges down to 0.20% by weight when the lead content ranges down to 72.45%. Similarly, in the case of thallium, the maximum effective concentration is dependent upon the lead content of the lead-selenium base alloy within the range stated therefor. We have found 1.5% by weight thallium to be the maximum effective concentration for lead-selenium base alloys containing 73.50% lead; for base alloys containing less lead, the maximum effective thallium concentration is somewhat less, that is ranges down to .72% by weight when the lead content ranges down to 72.45%. Similarly, in the case of arsenic, the maximum effective concentration is dependent upon the lead content of the lead-selenium base alloy within the range stated therefor, and ranges from 0.30% for base alloys containing 73.50% lead down to 0.10% for base alloys containing 72.45% lead. As indicated in Table II, the concentration weight percent at which the polarity reverses in the case of the thallium promoted base alloy ranges from 0.04% to 0.08% as the lead constituent of the lead-selenium base composition varies from 72.45% to 73.50%. Similarly, in the case of the arsenic promoted base alloy the concentration weight percent at which polarity reverses ranges from 0.02% to 0.06% as the lead content of the base alloy varies from 72.45% to 73.50%. This behavior of bismuth, antimony, thallium and arsenic is thought to be due to the formation of a bismuth-lead-selenium, an antimony-lead-selenium, a thallium-lead-selenium or an arsenic-lead-selenium complex within the intergranular phase aforementioned which accounts for a portion of the addition. All other third element additions aforementioned, both positive and negative, form complexes with the second or intergranular phase aforementioned to a much lesser extent than do bismuth, antimony, thallium and arsenic and for purposes of this invention, in the cases of such other additions these effects are inconsequential. Accordingly, no changes in the concentration limits thereof are necessary as the proportions of lead and selenium in the base alloy vary within the range stated therefor.

In Table I and II above, the thermoelectric power and resistivity data given is in both cases for the 72.45% lead, balance substantially all selenium composition containing the third element addition in question in the amount indicated in the table (in the case of bismuth, antimony, thallium and arsenic, the lower maximum effective amount indicated).

Figures 5 and 6 of the drawings may be here referred to for a graphic illustration of the effect of the additions of the positive promoters of Table II with respect to the resistivity and thermoelectric power characteristics (measured at room temperature) afforded by addition to the lead-selenium base alloys or compositions of each of the positive promoters set forth in Table II, and with the variations indicated in the amount thereof added in each case.

In connection with the aforementioned Figures 3 to 6, the logarithm of the percent by weight concentration, and the logarithm of the resistivity have been plotted for convenience, as will be understood by those skilled in the art, while thermoelectric power has been plotted linearly.

It will be observed upon examination of the data recorded in Figures 1 through 6, that a wide range of electrical properties can be induced in lead-selenium base alloys by third element additions, either positive or negative as desired. Bromine additions, for example, can reduce the resistivity of the lead-selenium base alloy by more than a factor of approximately 20, while reducing the thermoelectric power by a factor of 10.

The aforedescribed alloys or compositions and electrical conductors comprising the invention may be fabricated by melting together the alloy constituents aforementioned, within the concentration limits aforeindicated. It is to be understood, however, that as has been previously indicated, the lead-selenium alloys of the invention must be of a high order of purity, i. e., containing not in excess of the order of 0.001% by weight impurity. Such purity has been found to be necessary in practicing the present invention if the electrical properties of the alloys of this invention are to be reproducible. It is to be understood, however, that tellurium and sulphur, because of their chemical similarity to and natural occurrence with selenium, are frequently contaminants in commercial selenium and are difficult and expensive to remove to the extent of purity as specified above. We have found, however, that tellurium and sulphur concentrations of the order usually found in commercially pure selenium, usually of the order of 1%, cause no significant changes in the electrical properties of the alloys of this invention.

In the production of the new alloys or compositions of our invention and electrical conductors comprising the same, the constituents are melted at from 1085° C. to 1200° C. under a reducing atmosphere, and agitated to insure uniform distribution. The alloy may then be cast, formed or machined as desired. It is then preferably annealed to insure normalization of the alloy or composition. Such annealing may be accomplished at temperatures ranging from 540° C. to 815° C. for from 10 to 20 hours, the lesser time being required at the higher temperature. The aforementioned annealing may be conveniently accomplished by sealing the ingots of the alloy or composition within a quartz or Vycor envelope under a hydrogen atmosphere. This prevents loss of material and hence preservation of the ingots during annealing and affords a simple method of handling. The aforedescribed third element addition promoted compositions may then be slowly cooled to room temperature or quenched directly or at any intermediate temperature in cold water without substantially affecting the reproducibility of the desired electrical characteristics, especially as the concentration of the third element addition approaches its maximum effective concentration limit aforeindicated. Thus, the heat treatment history of the alloy or composition becomes of lesser importance in the third element addition promoted compositions aforedescribed as the concentration of the third element addition approaches the maximum effective limit aforeindicated.

The third element promoted alloy or composition is a two-phase alloy having improved electrical properties as compared to the corresponding properties of the lead-selenium base alloy. For example, the electrical properties of the third element addition promoted alloys or compositions are governed to a lesser extent by the heat treatment given the alloy, with variations in electrical properties considerably less than the variations exhibited by the lead-selenium base alloy to which no third element has been added. Thus, the third element additions, in effect, reduce the dependency of the electrical properties upon prior heat treatment and in this sense tend to stabilize these properties to a higher degree than that achieved in the lead-selenium base alloy. It may be stated as a general observation that the degree of stabilization increases with the concentration of the aforementioned third element additions up to the maximum effective amount thereof as above set forth. This lesser dependency of third element addition promoted alloys or compositions aforedescribed and of electrical conductors comprising the same, markedly increases the utility thereof for high temperature applications. In this connection, however, where alloys including positive promoters are concerned and where the application temperature approaches 570° C. concentrations of the positive promoter approaching the maximum effective limit aforementioned should be used to insure maintenance of positive polarity of the composition.

Compositions of the present invention also exhibit the desired physical properties aforementioned. More specifically, they are mechanically strong and stable under operating conditions. The coefficient of thermal expansion is of the order of $16 \times 10^{-6}/°$ C.

For an electrode material which is usable with electrical conductor elements of the alloys or compositions aforementioned, it is necessary that there be no tendency for the electrode and electrical conductor element to alloy with or dissolve one another at any temperature within the range of operating temperatures of the electrical conductor element. This is a very stringent requirement as the selenium constituent of such elements can readily alloy with or dissolve most of the metals commonly considered to be electrode materials. Moreover, the upper limit of operating temperature up to approximately 570° C. for the aforementioned alloys or compositions is in a range where extensive alloying or solution is common.

It has been discovered, as disclosed and claimed in the co-pending application of Russell E. Fredrick, Robert W. Fritts and William V. Huck, Serial No. 442,866, filed July 12, 1954, that for electrical conductor elements of the character under consideration, a contact electrode comprising iron or certain iron alloys afford contacts of low thermal and electrical resistance and are chemically stable. The contacts may, as will be explained hereinafter, be applied by mere pressure or may be bonded to the elements. The bonded form of iron contacts hereinafter referred to provide mechanically strong bonds.

Iron is acceptable as an electrode for electrical conductor elements of the lead-selenium base alloy or third element addition promoted compositions, in that it does not alloy or dissolve in such elements at temperatures below 700° C., which is well above the ordinary upper limit of operating temperatures therefor. Alloying or solution between the electrical conductor elements, and iron or iron alloy contact electrodes, takes place at above 730° C., thereby permitting bonded contacts for the electrical conductor elements to be formed very simply, as will hereinafter appear. Moreover, a reversal of the alloying or solution below approximately 700° C., we have found, purges the electrical conductor elements of any atomically dispersed iron which might otherwise seriously alter the electrical properties of such elements. Such minor amounts of iron as remain dispersed in the electrical conductor elements in the form of small precipitated particles after formation of the bonded contact not only have a negligible effect upon the the electrical properties of the elements, provided the amount of such dispersed iron is controlled, as will hereinafter be described, but also the presence of such minor iron concentration, we have found, increases the strength of the electrical conductor elements markedly since small particles of precipitated iron at the grain boundaries thereof appear to lock the grains together. It is, however, important that the iron be so controlled in amount and dispersed so that there will be no serious effect upon the thermoelectric properties of the electrical conductor elements. We have found that if the iron concentration is held to less than 0.5% by weight of the electrical conductor element, the thermoelectric power and electrical resistivity thereof will be reduced by only about 10%. The iron concentration can be held to within the aforementioned limit by forming the bonded contact in accordance with methods which will now be described.

A method of forming bonded contact electrodes of iron with electrical conductor elements of the abovementioned alloys or compositions stems from the fact that iron dissolves slowly in such alloys or compositions at about 730° C., that such alloys or compositions exhibit reduced melting points when laden with a few percent iron, and that, in fact, such melting points may lie below the phase transformation temperature of iron (905° C.). It has been observed that as little as 9.0% by weight iron affords an alloy having a melting point below the aforementioned transformation temperature of pure iron. Further detail data in this regard is set forth in the application last referred to and to which reference may be had. As will be apparent, a simple technique is thus provided by which bonded electrodes may be formed with iron or iron alloys since contact formation can take place at a temperature below that at which the phase transformation of iron occurs. Moreover, the method utilizing this technique about to be described, results in considerably less contamination of the electrical conductor element with iron after contacting than the .5% limit aforementioned. In fact, contamination resulting from this method generally is less than a few hundredths of one percent.

The method utilizing iron to lower the melting temperature of the aforementioned alloys or compositions may conveniently be denominated a fusion method. In this method an electrical conductor element of the aforementioned alloys or compositions, preformed as aforedescribed, is pressed against the surface of an iron or iron alloy electrode, and the electrode is then heated, preferably inductively, until a very thin layer of the alloy or composition becomes molten and fuses with the surface of the electrode. During such heating, the iron migrates slowly into the adjacent surface of the electrical conductor element, reducing the melting point of a thin layer of the latter. Due to its thin section the molten layer rapidly approaches the compositions which solidify at temperatures below the phase transformation temperatures of the iron to form the bond. Accordingly, the time of heating is only a matter of a few seconds, after which the assembly is allowed to cool.

In certain instances it is not feasible or convenient to preform the electrical conductor element as aforedescribed, in which case it is possible to cast such element and form the contact electrode simultaneously in accordance with the following method, for convenience denominated the "direct casting" method. Iron is placed in a mold, preferably of graphite, and any of the aforementioned alloys or compositions in chunk or granular form is also placed therein in contiguous engagement with the iron. The mold is then heated, preferably in a reducing atmosphere, to the melting point of such alloy or compositions, that is, within the temperature range of 1085° C. to 1200° C. for a short interval of time to produce limited alloying between the iron and such alloy or composition. The mold is then cooled causing the aforementioned alloy or composition melt to solidify as an ingot firmly bonded to the iron electrode. The optimum temperature for contact formation in a hydrogen atmosphere has been found to lie in the aforementioned range, since above 1200° C. the alloying advances too rapidly to be accurately controlled, and below 1085° C. it may be retarded by solid particles of the alloy or composition which have not had time to absorb heat and melt.

The time of exposure at 1085° C. to 1200° C. must likewise be carefully controlled to prevent excessive alloying or solution of the iron of the electrode in the alloy or composition melt, and consequent impairment of the electrical properties of the resultant electrical conductor element.

The amount of iron which precipitates into the alloy or composition melt depends upon the area of contact between the iron and the alloy or composition melt and the volume of the latter, as well as the time of exposure. More specifically, the time of exposure at a given temperature within the aforeindicated range is proportional to the volume, and inversely proportional to the area of contact. Accordingly, we have found the maximum time of exposure in seconds at, for example 1200° C. (which will result in the migration of no more than 0.5% of iron into the alloy or composition melt) can best be expressed as being about 12 times the ratio of the volume of such alloy or composition melt to the area of engagement thereof with the electrode expressed in centimeters.

For example, the time of exposure for an element of the aforementioned alloy or composition of length 1.27 cm. and diameter 0.635 cm., placed in a mold as aforeindicated with its end in contiguous engagement with an iron electrode as aforedescribed is less than 60 seconds. Under such conditions, the electrical conductor element can be cast on an alpha-stabilized iron electrode at 1200° C. for from 5 to 60 seconds without contaminating the element with more than 0.5% iron by precipitation thereof throughout the element as the mold is cooled.

In the formation of bonded contact electrodes by the direct casting method aforedescribed, it is necessary that the iron utilized be a phase-stabilized alloy of iron since the bond in this case is accomplished at a temperature 10° C. or more, depending upon the alloy or composition, above the transformation temperature of iron (this temperature being about 905° C. at which alpha-phase iron (ferrite) transforms into gamma-phase (austenite)). Such phase stabilization is necessary to avoid shearing the solid bond between the electrical conductor element and the electrode during cooling.

It is, however, preferable that the iron forming the bonded electrode in the aforedescribed method be stabilized in the alpha phase because the iron migration rate is substantially lower in this case than in the case of gamma-phase-stabilized iron, and hence the control of the exposure time is less critical. For example, when the exposure time at 1200° C. is limited to 30 seconds for a sample of nominal size as aforeindicated, the iron content of the contacted element can be held below the limit of 0.5% by weight when the electrode is alpha-phase stabilized.

Conventional alpha or gamma phase stabilizers well known to those skilled in the art may be utilized for the aforeindicated purposes. However, a preferred alpha stabilizer for high temperature contact is molybdenum, since the junction between the electrical conductor element and molybdenum-iron contact electrode appears to be more intimate and freer of small blow-holes than most other alloys.

Thus, the preferred contact electrode for electrical conductor elements formed in accordance with the aforedescribed method is, we have discovered, alpha-stabilized iron and more particularly, iron stabilized in the alpha phase by the addition of from 2.7 to 7% molybdenum.

When a bonded electrode is formed by either the direct casting or fusion method aforedescribed, it is preferable to anneal the contacted electrical conductor element subsequent to contact formation at from 540° C. to 680° C. for from 10 to 20 hours to render the composition more homogenous. It should also be understood that in the aforedescribed methods the iron should be substantially free of surface oxides and all contact formations accomplished under a reducing atmosphere since the aforementioned alloys or compositions alloy poorly with iron if an oxide layer is present.

While the direct casting method aforedescribed is somewhat simpler in that it permits casting of the electrical conductor elements simultaneously with formation of the bonded iron contact electrode, the fusion method aforedescribed is advantageous in that it may be employed for alpha or gamma stabilized alloys as well as pure iron and unstabilized alloys. However, high carbon steel is not a desirable electrode in either method since high carbon concentration in iron unduly lowers the iron transformation temperature. The fusion method has an added advantage in that the average iron concentration within the contacted element itself resulting from the bonding procedure is much less than in the direct casting method, and in fact, is, we have found, less than .01% by weight as an average proposition. Thus, even iron alloys containing relatively large concentrations of chromium, nickel, manganese, etc. (which are ordinarily detrimental to the electrical properties of the alloys and compositions aforementioned) can be used as contact electrodes without detrimental effect upon the electrical properties of the element due to their extremely small resulting concentration therein.

We claim:

1. A composition consisting essentially of a lead-selenium base constituent consisting essentially of from 72.45% to 73.50% by weight lead, the balance substantially all selenium, and a member selected from the group consisting of, iodine, chlorine, bromine, zirconium, silicon, titanium, indium, tantalum, gallium, aluminum, copper, gold, bismuth, antimony, fluorine, columbium, sodium, thallium, potassium, lithium and arsenic, in an amount effective to modify the conductivity of said base constituent not in excess by weight percent of the lead and selenium of said members as follows: 0.50 iodine; 0.20 chlorine; 0.60 bromine; 0.60 zirconium; 0.10 silicon; 0.10 titanium; 0.20 indium; 0.60 tantalum; 0.15 gallium; 0.03 aluminum; 0.30 copper; 0.35 gold; 0.02 fluorine; 0.35 columbium; 0.08 sodium; 0.15 potassium; 0.03 lithium; and bismuth, antimony, thallium and arsenic not in excess of from 0.40 to 2.5, from 0.20 to 1.5, from 0.72 to 1.5 and from 0.10 to 0.30, respectively, over the aforementioned range of lead.

2. A composition consisting essentially of a lead-selenium base constituent consisting essentially of from 72.45% to 73.50% lead by weight, balance substantially all selenium, and iodine in an amount effective to modify the conductivity of said base constituent not in excess of 0.50% by weight of the lead and selenium.

3. A composition consisting essentially of a lead-selenium base constituent consisting essentially of from 72.45% to 73.50% lead by weight, balance substantially all selenium, and chlorine in an amount effective to modify the conductivity of said base constituent not in excess of 0.20% by weight of the lead and selenium.

4. A composition consisting essentially of a lead-selenium base constituent consisting essentially of from 72.45% to 73.50% lead by weight, balance substantially all selenium, and bromine in an amount effective to modify the conductivity of said base constituent not in excess of 0.60% by weight of the lead and selenium.

5. A composition consisting essentially of a lead-selenium base constituent consisting essentially of from 72.45% to 73.50% lead by weight, balance substantially all selenium, and zirconium in an amount effective to modify the conductivity of said base constituent not in excess of 0.60% by weight of the lead and selenium.

6. A composition consisting essentially of a lead-selenium base constituent consisting essentially of from 72.45% to 73.50% lead by weight, balance substantially all selenium, and silicon in an amount effective to modify the conductivity of said base constituent not in excess of 0.10% by weight of the lead and selenium.

7. A composition consisting essentially of a lead-selenium base constituent consisting essentially of from 72.45% to 73.50% lead by weight, balance substantially all selenium, and titanium in an amount effective to modify the conductivity of said base constituent not in excess of 0.10% by weight of the lead and selenium.

8. A composition consisting essentially of a lead-selenium base constituent consisting essentially of from 72.45% to 73.50% lead by weight, balance substantially all selenium, and indium in an amount effective to modify the conductivity of said base constituent not in excess of 0.20% by weight of the lead and selenium.

9. A composition consisting essentially of a lead-selenium base constituent consisting essentially of from 72.45% to 73.50% lead by weight, balance substantially all selenium, and tantalum in an amount effective to modify the conductivity of said base constituent not in excess of 0.60% by weight of the lead and selenium.

10. A composition consisting essentially of a lead-selenium base constituent consisting essentially of from 72.45% to 73.50% lead by weight, balance substantially all selenium, and gallium in an amount effective to modify the conductivity of said base constituent not in excess of 0.15% by weight of the lead and selenium.

11. A composition consisting essentially of a lead-selenium base constituent consisting essentially of from 72.45% to 73.50% lead by weight, balance substantially all selenium, and aluminum in an amount effective to modify the conductivity of said base constituent not in excess of 0.03% by weight of the lead and selenium.

12. A composition consisting essentially of a lead-selenium base constituent consisting essentially of from 72.45% to 73.50% lead by weight, balance substantially all selenium, and copper in an amount effective to modify the conductivity of said base constituent not in excess of 0.30% by weight of the lead and selenium.

13. A composition consisting essentially of a lead-selenium base constituent consisting essentially of from 72.45% to 73.50% lead by weight, balance substantially all selenium, and gold in an amount effective to modify the conductivity of said base constituent not in excess of 0.35% by weight of the lead and selenium.

14. A composition consisting essentially of a lead-selenium base constituent consisting essentially of from 72.45% to 73.50% lead by weight, balance substantially all selenium, and bismuth in an amount effective to modify the conductivity of said base constituent not in excess of from 0.40% to 2.5% by weight of the lead and selenium over the aforementioned range of lead.

15. A composition consisting essentially of a lead-selenium base constituent consisting essentially of from 72.45% to 73.50% lead by weight, balance substantially all selenium, and antimony in an amount effective to modify the conductivity of said base constituent not in excess of from 0.20% to 1.5% by weight of the lead and selenium over the aforementioned range of lead.

16. A composition consisting essentially of a lead-selenium base constituent consisting essentially of from 72.45% to 73.50% lead by weight, balance substantially all selenium, and fluorine in an amount effective to modify the conductivity of said base constituent not in excess of 0.02% by weight of the lead and selenium.

17. A composition consisting essentially of a lead-selenium base constituent consisting essentially of from 72.45% to 73.50% lead by weight, balance substantially all selenium, and columbium in an amount effective to modify the conductivity of said base constituent not in excess of 0.35% by weight of the lead and selenium.

18. A composition consisting essentially of a lead-selenium base constituent consisting essentially of from 72.45% to 73.50% lead by weight, balance substantially all selenium, and sodium in an amount effective to modify the conductivity of said base constituent not in excess of 0.08% by weight of the lead and selenium.

19. A composition consisting essentially of a lead-selenium base constituent consisting essentially of from 72.45% to 73.50% lead by weight, balance substantially all selenium, and thallium in an amount effective to modify the conductivity of said base constituent not in excess of from 0.72% to 1.5% by weight of the lead and selenium over the aforementioned range of lead.

20. A composition consisting essentially of a lead-selenium base constituent consisting essentially of from 72.45% to 73.50% lead by weight, balance substantially all selenium, and potassium in an amount effective to modify the conductivity of said base constituent not in excess of 0.15% by weight of the lead and selenium.

21. A composition consisting essentially of a lead-selenium base constituent consisting essentially of from 72.45% to 73.50% lead by weight, balance substantially all selenium, and lithium in an amount effective to modify the conductivity of said base constituent not in excess of 0.03% by weight of the lead and selenium.

22. A composition consisting essentially of a lead-selenium base constituent consisting essentially of from 72.45% to 73.50% lead by weight, balance substantially all selenium, and arsenic in an amount effective to modify the conductivity of said base constituent not in excess of from 0.10% to 0.30% by weight of the lead and selenium over the aforementioned range of lead.

23. The method of controlling the electrical characteristics of a lead-selenium composition consisting essentially of from 72.45% to 73.50% lead by weight, balance substantially all selenium, which comprises alloying therewith at least one member from the group consisting of iodine, chlorine, bromine, zirconium, silicon, titanium, indium, tantalum, gallium, aluminum, copper, gold, bismuth, antimony, fluorine, columbium, sodium, thallium, potassium, lithium and arsenic, in an amount not in excess by weight percent of the lead and selenium of said members as follows: 0.50 iodine; 0.20 chlorine; 0.60 bromine; 0.60 zirconium; 0.10 silicon; 0.10 titanium; 0.20 indium; 0.60 tantalum; 0.15 gallium; 0.03 aluminum; 0.30 copper; 0.35 gold; 0.02 fluorine; 0.35 columbium; 0.08 sodium; 0.15 potassium; 0.03 lithium; and bismuth, antimony, thallium and arsenic not in excess of from 0.40% to 2.5%, from 0.20% to 1.5%, from 0.72% to 1.5% and from 0.10% to 9.30% respectively, over the aforesaid range of lead, and then annealing the resultant composition at a temperature of from about 540° C. to 815° C.

24. A composition consisting essentially of a base constituent consisting essentially of lead and selenium, the percent by weight of lead being 72.45% to 73.50%, balance substantially all selenium, and no more than of the order of 0.001% by weight of other matter except for a promoter selected from the group consisting of iodine, chlorine, bromine, zirconium, silicon, titanium, indium, tantalum, gallium, aluminum, copper, gold, bismuth, antimony, fluorine, columbium, sodium, thallium, potassium, lithium and arsenic in an amount effective to modify the conductivity of said base constituent not in excess by weight percent of the lead and selenium of said promoters as follows: 0.50 iodine; 0.20 chlorine; 0.60 bromine; 0.60 zirconium; 0.10 silicon; 0.10 titanium; 0.20 indium; 0.60 tantalum; 0.15 gallium; 0.03 aluminum; 0.30 copper; 0.35 gold; 0.02 fluorine; 0.35 columbium; 0.08 sodium; 0.15 potassium; 0.03 lithium; and bismuth, antimony, thallium and arsenic not in excess of from 0.40 to 2.5, from 0.20 to 1.5, from 0.72 to 1.5 and from 0.10 to 0.30, respectively, over the aforementioned range of lead.

25. A negative electrical conductor consisting essentially of a base constituent consisting essentially of 72.45% to 73.50% lead by weight, balance substantially all selenium, and not more than of the order of 0.001% by weight of other material except for a member selected from the group consisting of iodine, chlorine, bromine, zirconium, silicon, titanium, indium, tantalum, gallium, aluminum, copper, gold, bismuth, antimony, fluorine, columbium, sodium, potassium, lithium, thallium and arsenic, with the iodine, chlorine, bromine, zirconium, silicon, titanium, indium, tantalum, gallium, aluminum, copper, gold, bismuth, antimony, fluorine, columbium, sodium, thallium, potassium, lithium and arsenic, in an amount effective to modify the conductivity of said base constituent not in excess by weight percent of the lead and selenium of said members as follows: 0.50 iodine; 0.20 chlorine; 0.60 bromine; 0.60 zirconium; 0.10 silicon; 0.10 titanium; 0.20 indium; 0.60 tantalum; 0.15 gallium; 0.03 aluminum; 0.30 copper; 0.35 gold; 0.02 fluorine; 0.35 columbium; 0.002 sodium; 0.003 potassium; 0.002 lithium; and bismuth, antimony, thallium and arsenic not in excess of from 0.40 to 2.5, from 0.20 to 1.5, from 0.04 to 0.08, and from 0.02 to 0.06, respectively, over the aforementioned range of lead.

26. A multi-phase alloy consisting essentially of a base constituent consisting essentially of lead and selenium, the percent by weight of lead being 72.45% to 73.50%, balance substantially all selenium, having a phase constituting primarily the intermetallic compound lead-selenide and having another phase constituting primarily excess lead, and no more than of the order of 0.001% by weight of other matter, except for a promoter selected from the group consisting of iodine, chlorine, bromine, zirconium, silicon, titanium, indium, tantalum, gallium, aluminum, copper, gold, bismuth, antimony, fluorine, columbium, sodium, thallium, potassium, lithium and arsenic in an amount effective to modify the conductivity of the base constituent not in excess by weight percent of the lead and selenium of said promoters as follows: 0.50 iodine; 0.20 chlorine; 0.60 bromine; 0.60 zirconium; 0.10 silicon; 0.10 titanium; 0.20 indium; 0.60 tantalum; 0.15 gallium; 0.03 aluminum; 0.30 copper; 0.35 gold; 0.02 fluorine; 0.35 columbium; 0.08 sodium; 0.15 potassium; 0.03 lithium; and bismuth, antimony, thallium and arsenic not in excess of from 0.40 to 2.5, from 0.20 to 1.5, from 0.72 to 1.5 and from 0.10 to 0.30, respectively, over the aforementioned range of lead.

References Cited in the file of this patent
UNITED STATES PATENTS 775,188     Lyons _____ Nov. 15, 1904

OTHER REFERENCES

"Chemical Abstracts," vol. 47, pages 2591(d), 3720(c), and 6246(a). Published by The American Chemical Society, 1953.

UNITED STATES PATENT OFFICE

CERTIFICATE OF CORRECTION

Patent No. 2,811,720                                                              October 29, 1957

Robert W. Fritts et al.

It is hereby certified that error appears in the printed specification of the above numbered patent requiring correction and that the said Letters Patent should read as corrected below.

Column 13, line 35, for "0.10% to 9.30%" read -- 0.10% to 0.30% --.

Signed and sealed this 7th day of January 1958.

(SEAL)
Attest:

KARL H. AXLINE
Attesting Officer

ROBERT C. WATSON
                                                                                     Commissioner of Patents